Patented Mar. 31, 1925.

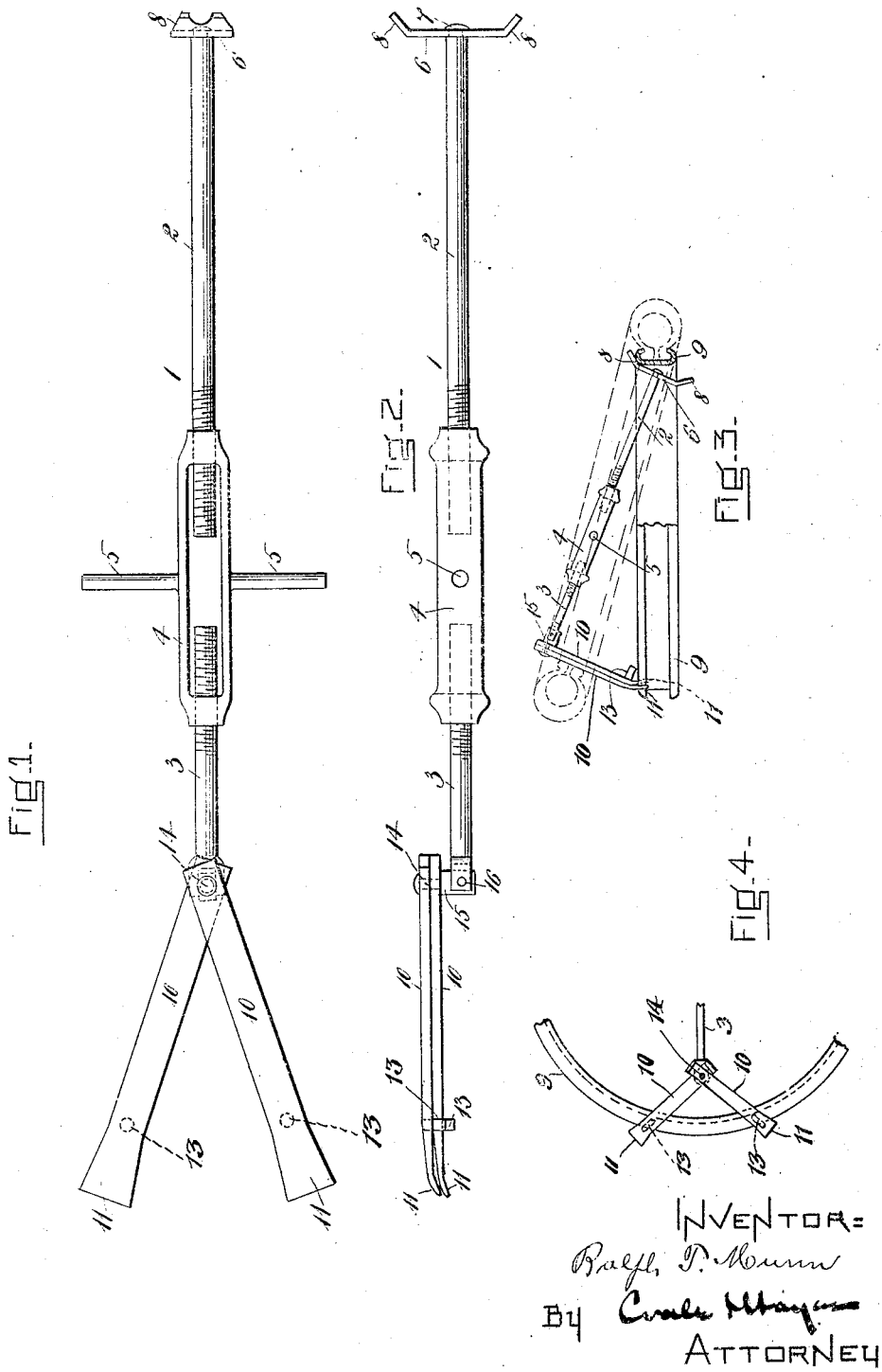

1,531,409

UNITED STATES PATENT OFFICE.

RALPH T. MUNN, OF WAKEFIELD, MASSACHUSETTS.

TIRE-SETTING TOOL.

Application filed October 24, 1924. Serial No. 745,711.

*To all whom it may concern:*

Be it known that I, RALPH T. MUNN, of Wakefield, in the county of Middlesex and State of Massachusetts, a citizen of the United States, have invented a new and useful Improvement in Tire-Setting Tools, of which the following is a full, clear, and exact description, reference being had to the accompanying drawings, forming a part of this specification, in explaining its nature.

The invention relates to a tool or device for applying a pneumatic tire to the rim of a wheel and especially to a non-split or solid rim.

The object of the invention is to provide a tool by means of which the tire may be applied to the rim with the least possible distortion of the tire and to provide, also, a tool easily applied to the rim and quickly and easily manipulated for setting the tire and one which may be folded to occupy but little space when not in use.

The invention can best be seen and understood by reference to the drawings, in which—

Figure 1 is a plan of the tool.

Fig. 2 shows the tool in side elevation, and

Fig. 3 shows partly in section and partly in side elevation a rim and in side elevation the tire-setting tool applied thereto in position for setting the tire.

Fig. 4 is a plan view of portions of the tool and rim, as shown in Fig. 3.

Referring to the drawings:—

1 represents a lengthwise extensible rod comprising sections 2 and 3, respectively. The inner end portions of these sections are threaded with right and left threads, respectively, and arranged thereon and connecting the two sections is a turnbuckle 4 by which the rod is lengthwise extended or retracted. The turnbuckle is preferably provided with handles 5 laterally extending from it and by which it may be conveniently turned.

The section 2 of the rod is provided at its outer end with a footpiece 6. This footpiece is fixed to the end of the rod preferably by a bolt 7. The footpiece extends in opposite directions from the end of the rod and is preferably provided with outturned ends 8. It is adapted to have bearing against the interior of the rim 9 of a wheel on one side of the rim when the rod 1 is occupying an inclined position with relation to the rim, with extension over the rim substantially crosswise it as shown in Fig. 3. Hinged to the outer end of the section 3 of the rod are one or more arms 10, two arms of equal length preferably being employed. These arms are adapted to depend from the end of the rod with bearing at their lower ends 11 against the exterior of the rim 9 on the side thereof opposite the side against which the footpiece 6 has bearing when the rod is occupying its inclined position as aforesaid. By reference to Fig. 3 it will be observed that the lower ends 11 of the arms bear against the outer face of the flange 12 of the rim and do not extend into the space between the two flanges of the rim. The ends 11 of the arms are also preferably flattened to have but little thickness and bear snugly against the face of the flange to the rim.

The bearing of the arms against the rim is maintained and the arms are permitted to turn or fulcrum thereon by means of spurs 13 projecting from the arms on the inside thereof just inwardly removed from their outer ends and when the arms are in proper position in engagement with the rim have bearing against the side of the rim.

The arms 10 are pivotally connected at their upper ends to permit of their straddling for engaging the rim at separate points and they are also hinged to the end of the rod 1, or more properly to the outer end of the section 3 of the rod. The hinge connection between the arms and the rod is such that when the rod is occupying its inclined position with the arms depending therefrom and engaging the rim substantially as shown in Fig. 3, the arms may be moved outwardly or inwardly with relation to the centre of the rim as the rod is lengthwise extended or retracted by the turnbuckle. To this end both the pivotal connection of the arms and their hinge connection to the rod is obtained by means of a bolt 14 having an extension 15. The bolt is passed through the two arms and headed with the extension 15 of slightly larger diameter than the bolt extending inwardly from the arms and making hinge connection with the outer end of the section 3 of the rod by means of a pin 16. The connection thus provided has ample flexibility to permit of all desired movements and its flexibility is increased by reason of the fact that the hinge connection of the arms is made with a rotatable part, viz: the section 3 of the rod which turns within the turnbuckle.

The operation of the tool or the manner in which it functions to apply or set a tire onto a rim is as follows: The tool is applied to the rim with the foot piece 6 bearing against the inside of the rim on one side thereof with the rod inclined upwardly therefrom over the rim substantially crosswise it and the arms depending from the outer end of the rod with outward inclination and engaging the opposite side of the rim with bearing thereon, all as above described and as shown in Fig. 3. The tire is then applied with one side fitting within the rim at the point of the rim against which the footpiece 6 is bearing. From this point the tire is inclined upwardly and fits over the outer faces of the outwardly-inclined arms 10 substantially as shown in the dotted lines of Fig. 3. In this connection it will be understood that the rod is sufficiently retracted to permit of an easy application of the tire to the arms. The tire is then worked onto opposite sides of the rim as much as possible and then the rod is lengthwise extended by operation of the turnbuckle until the arms 10, fulcruming on the rim, are turned outwardly into such inwardly-inclined position stretching the tire, that the tire will slip off the inner ends of the arms onto the rim.

When the tool is not in use the arms are foldable against the rod or the arms may be folded against the rod section 3 and the other section removed from the turnbuckle leaving a very small package.

Having thus fully described my invention, I claim and desire to secure by Letters Patent of the United States:—

1. A tire-setting tool comprising a lengthwise extensible rod provided with means for extending said rod, a footpiece at one end of the rod adapted to have bearing against the interior of the rim of a wheel on one side thereof when the rod is occupying an inclined position with relation to the rim with extension over the rim substantially crosswise it, an arm hinged to said rod at its opposite end adapted to depend therefrom and having bearing against said rim on the side thereof opposite the side against which said footpiece has bearing when said rod is occupying its inclined position as aforesaid, and means forming a hinge connection between said rod and arm whereby said arm when arranged as aforesaid and fulcruming on said rim will be moved outwardly with relation to the centre of said rim as said rod is lengthwise extended.

2. A tire-setting tool comprising a lengthwise extensible rod provided with means for extending said rod, a footpiece at one end of the rod adapted to have bearing against the interior of the rim of a wheel on one side thereof when the rod is occupying an inclined position with relation to the rim with extension over the rim substantially crosswise it, an arm hinged to said rod at its opposite end adapted to depend therefrom and have bearing against the exterior of said rim on the side thereof opposite the side against which said footpiece has bearing when said rod is occupying its inclined position as aforesaid, means carried by the arm by which it will maintain its bearing on said rim and be permitted to fulcrum thereon, and means forming a hinge connection between said rod and arm whereby said arm when arranged as aforesaid and fulcruming on said rim will be moved outwardly with relation to the centre of said rim as said rod is lengthwise extended.

3. A tire-setting tool comprising a lengthwise extensible rod having separate sections with a turnbuckle connecting said sections, a footpiece at the end of one section of the rod adapted to have bearing against the interior of the rim of a wheel on one side thereof when the rod is occupying an inclined position with relation to the rim with extension over the rim substantially crosswise it, a set of pivotally-connected arms hinged to the end of the other section of said rod adapted to depend therefrom and have bearing against said rim at spaced points on the side thereof opposite the side against which said footpiece has bearing when said rod is occupying its inclined position as aforesaid, spurs carried by each of the respective arms by which they may, respectively, maintain their bearings on said rim and be permitted to fulcrum thereon, and means forming a hinge connection between said arms and rod whereby said arms when arranged as aforesaid and fulcruming on said rim will be moved outwardly with relation to the centre of the rim as said rod is lengthwise extended.

RALPH T. MUNN.